(12) United States Patent
Tsai

(10) Patent No.: US 7,806,071 B1
(45) Date of Patent: Oct. 5, 2010

(54) BICYCLE BELL IN THE VICINITY OF BRAKE LEVER

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 18 days.

(21) Appl. No.: 12/409,244

(22) Filed: Mar. 23, 2009

(51) Int. Cl.
*B62J 3/00* (2006.01)
(52) U.S. Cl. .................. 116/167; 116/164; 116/166
(58) Field of Classification Search ............... 116/148, 116/149, 152, 155–159, 164, 166, 167, 169, 116/171, 172, 60; 74/502.2, 489; 84/406; D10/116; D17/22; 188/24.11, 24.22, 72.9, 188/206 R
See application file for complete search history.

(56) References Cited

U.S. PATENT DOCUMENTS

| | | | | |
|---|---|---|---|---|
| 559,950 A | * | 5/1896 | Rhind | 116/164 |
| 574,643 A | * | 1/1897 | Treadwell | 116/164 |
| 599,988 A | * | 3/1898 | Sanford | 116/164 |
| 632,427 A | * | 9/1899 | Plummer | 116/62 |
| 7,424,863 B2 | * | 9/2008 | Tsai | 116/148 |

* cited by examiner

*Primary Examiner*—Amy Cohen Johnson

(57) ABSTRACT

A bicycle bell includes a housing mounted on a handlebar and comprising a channel and an upward extending flange partially surrounding a top of the channel; a guide member secured to the housing; a drum secured to and covered the guide member; and a spring biased striking device mounted on the channel and comprising a bell lever and an opposite clapper extending through the flange to contact the guide member. Pivoting the bell lever about the channel will pivotably move the clapper to strike a first position on the drum after passing the guide member. Releasing the bell lever will return the clapper to its inoperative position after passing the guide member and striking an opposite second position on the drum. The bell is easy to manipulate with the same hand squeezing the brake lever.

1 Claim, 5 Drawing Sheets

BICYCLE BELL IN THE VICINITY OF BRAKE LEVER

BACKGROUND OF THE INVENTION

1. Field of Invention

The invention relates to bicycle bells and more particularly to a bicycle bell mounted in the vicinity of a brake lever for easy manipulation and having other improved characteristics.

2. Description of Related Art

Conventionally, a bicycle warning bell is mounted on a handlebar and a distance between the bell and a brake lever is longer than the length of the thumb. It is thus typical for a rider to press a bell lever with the thumb and try to use the remaining fingers of the same hand to squeeze a brake lever when approaching, for example, pedestrian and further when brake is needed.

In fact the rider has to, for example, temporarily leave his or her hand off the brake lever so that the hand then can press the bell lever to cause a clapper to strike the bell drum. As a result, a warning ring is generated.

However, this is not a safe operation due to the temporary disengagement of the hand from the brake lever when braking. This is because the bell is mounted on a position of the handlebar beyond the reach of the thumb. Thus, a need for improvement exists.

The invention described later is an outgrowth of earlier work by the inventor hereof, described in U.S. Pat. No. 7,424,863, entitled "Bell and Brake Lever Combination for Bicycle", the teachings of which are incorporated herein by reference.

SUMMARY OF THE INVENTION

It is therefore one object of the invention to provide a bicycle bell mounted in the vicinity of a brake lever for easy manipulation.

It is another object of the invention to provide a bicycle bell adapted to play two different particular sequences of tones in one striking operation.

The above and other objects, features and advantages of the invention will become apparent from the following detailed description taken with the accompanying drawings.

DETAILED DESCRIPTION OF THE INVENTION

Figure 1:
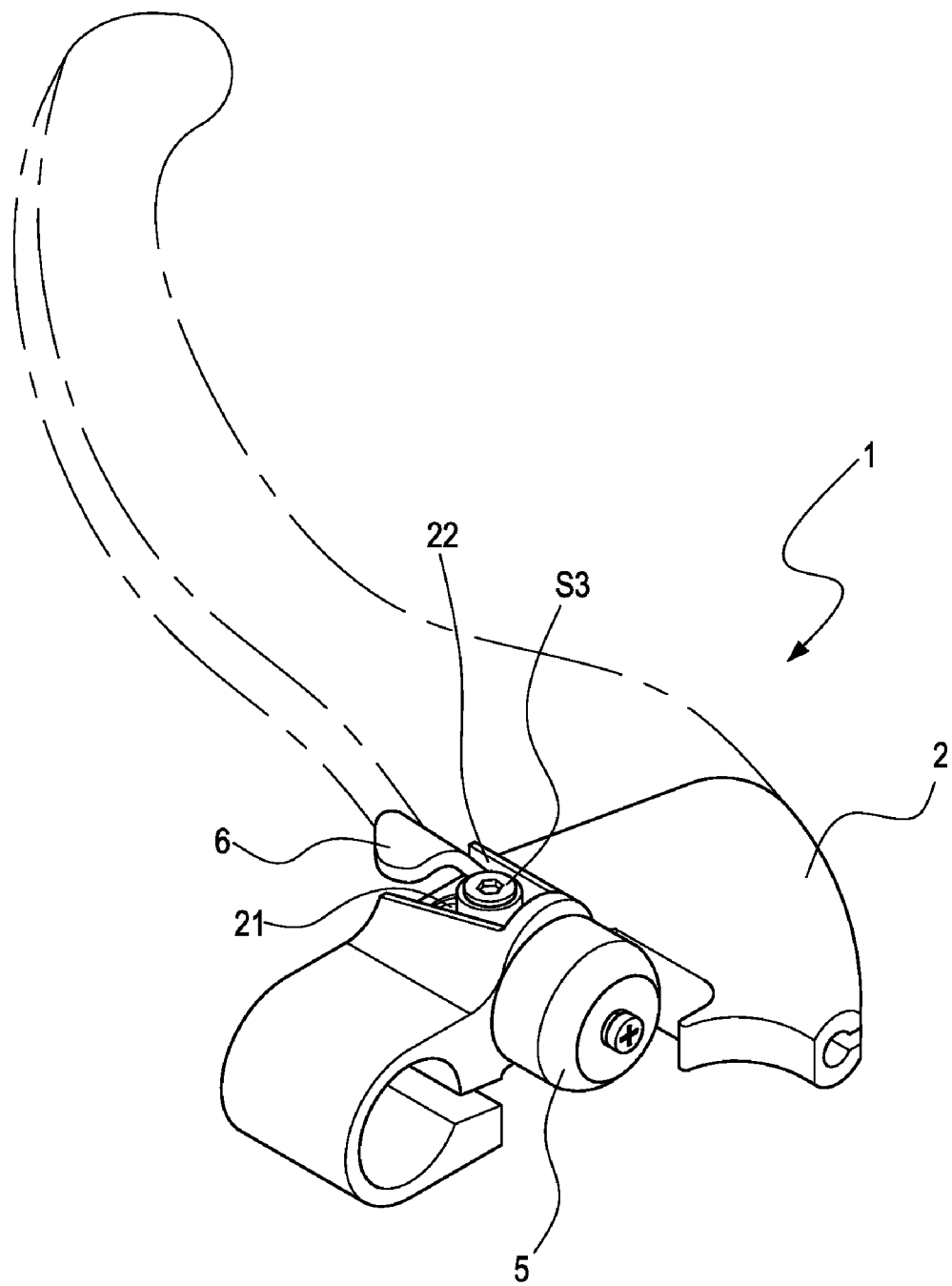
FIG. 1 is a perspective view of a preferred embodiment of bicycle bell mounted in the vicinity of the base of a brake lever according to the invention.
Figure 2:
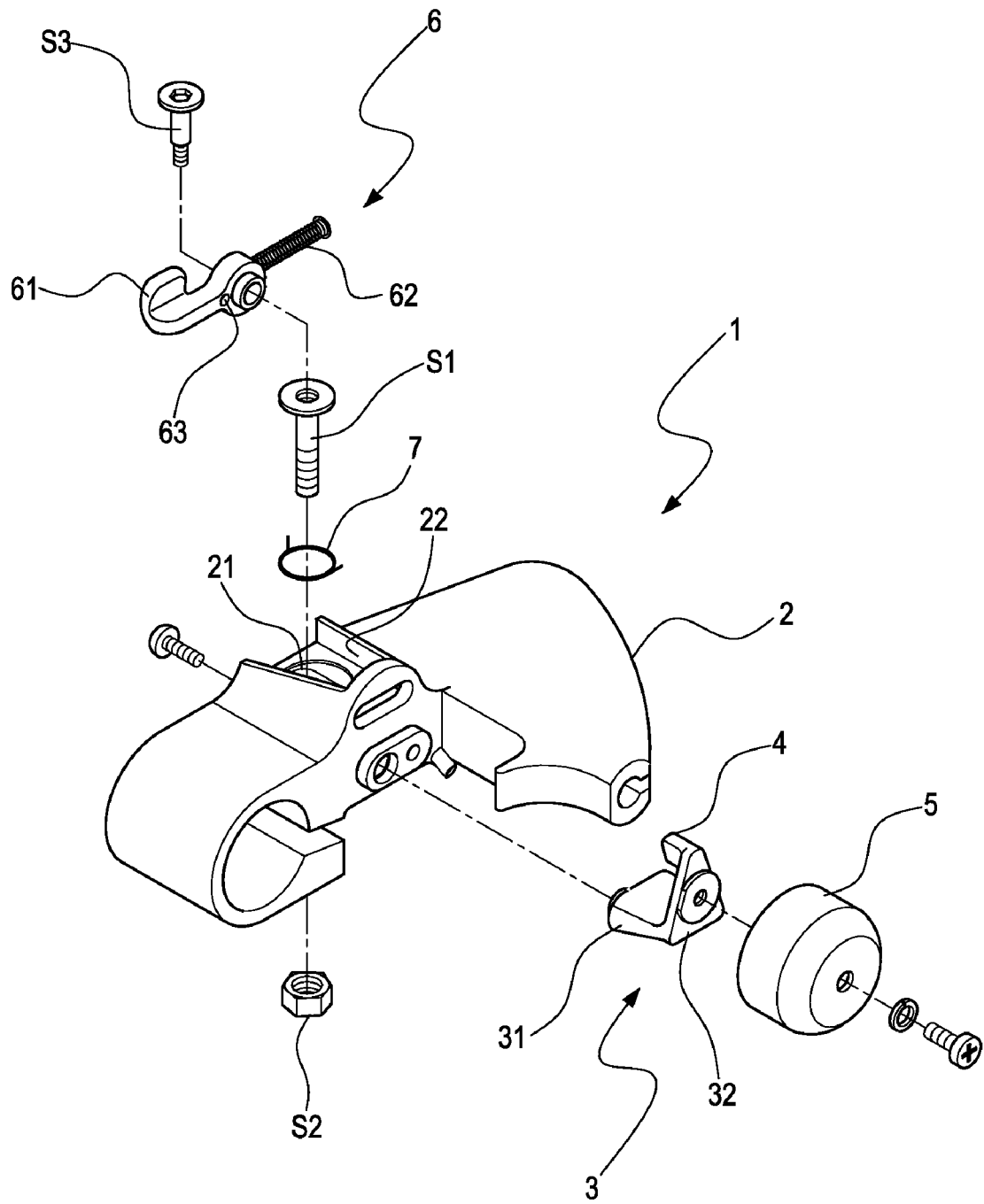
FIG. 2 is an exploded view of the bicycle bell with the brake lever removed.
Figure 3:
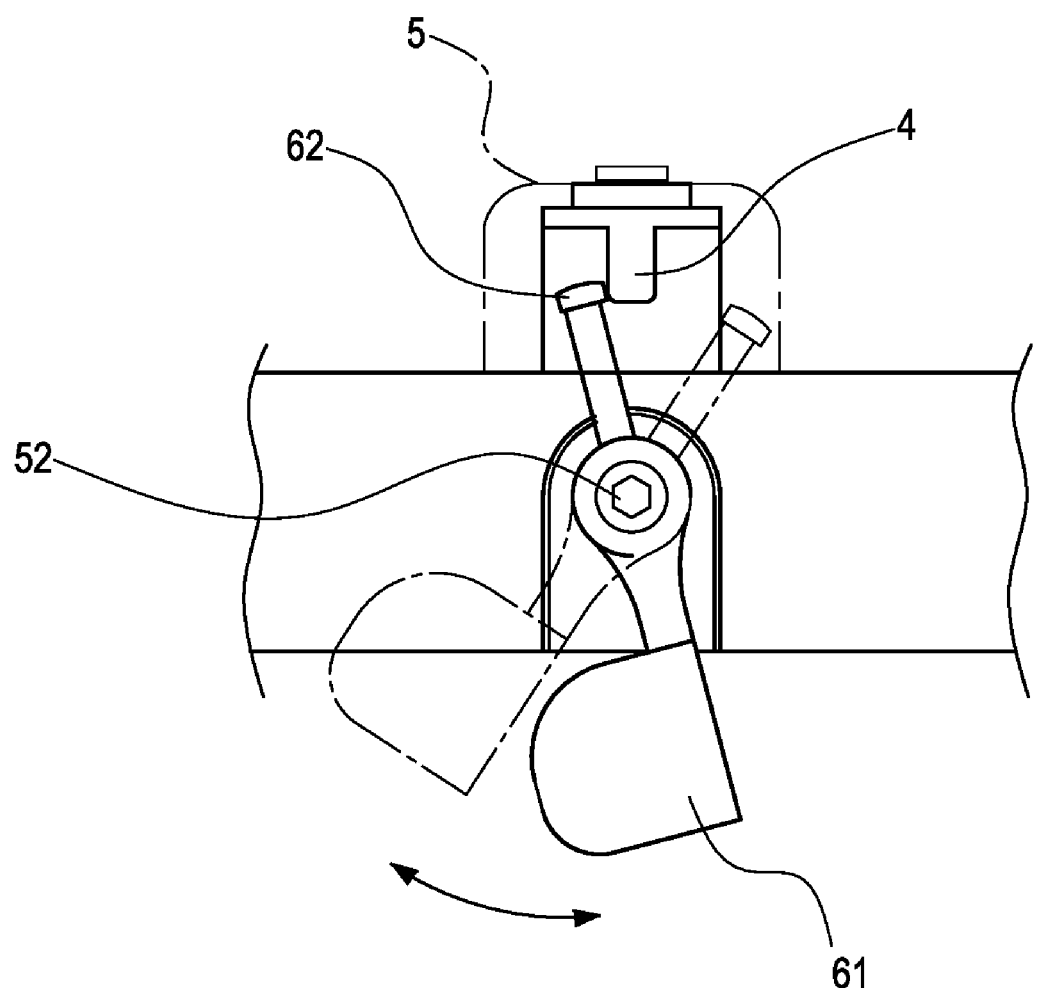
FIG. 3 is a schematic top view of a portion of FIG. 1 showing a pivotal operation of the bell lever and the clapper for striking the drum.
Figure 4:
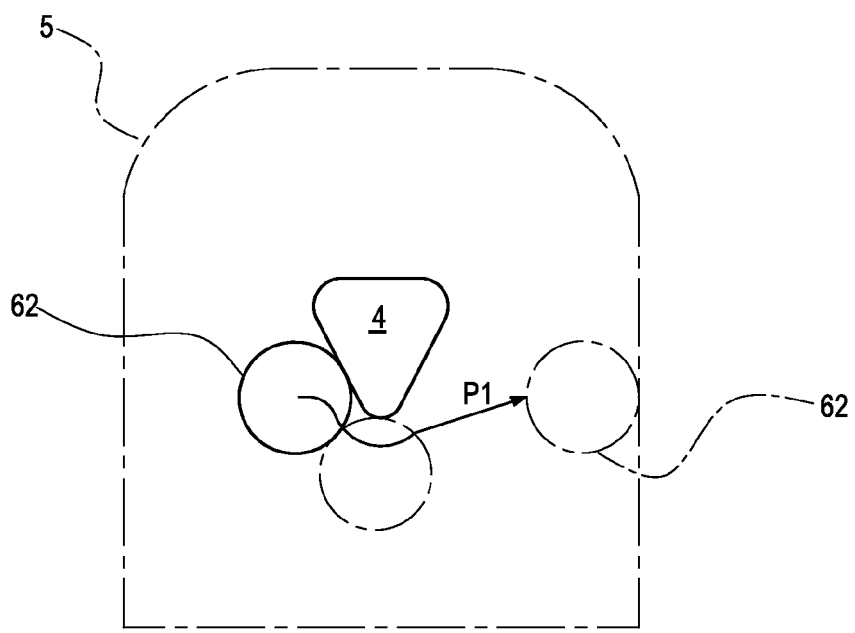
FIG. 4 schematically depicts the clapper striking the drum via the guide member in one half operation to play a first particular sequence of tones.
Figure 5:
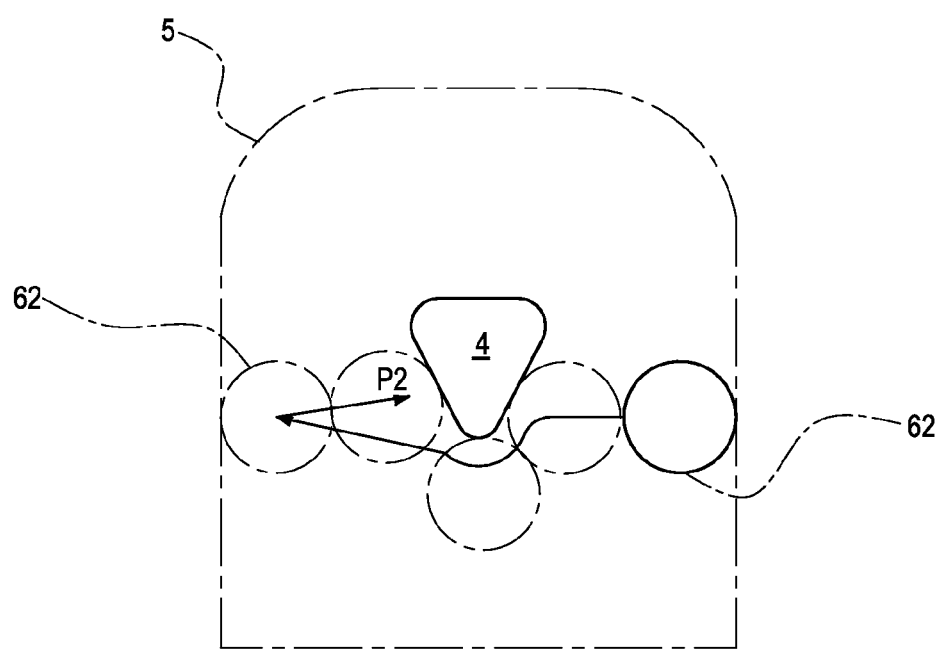
FIG. 5 schematically depicts the clapper striking the drum via the guide member in the other half operation to play a second particular sequence of tones.
Figure 6:
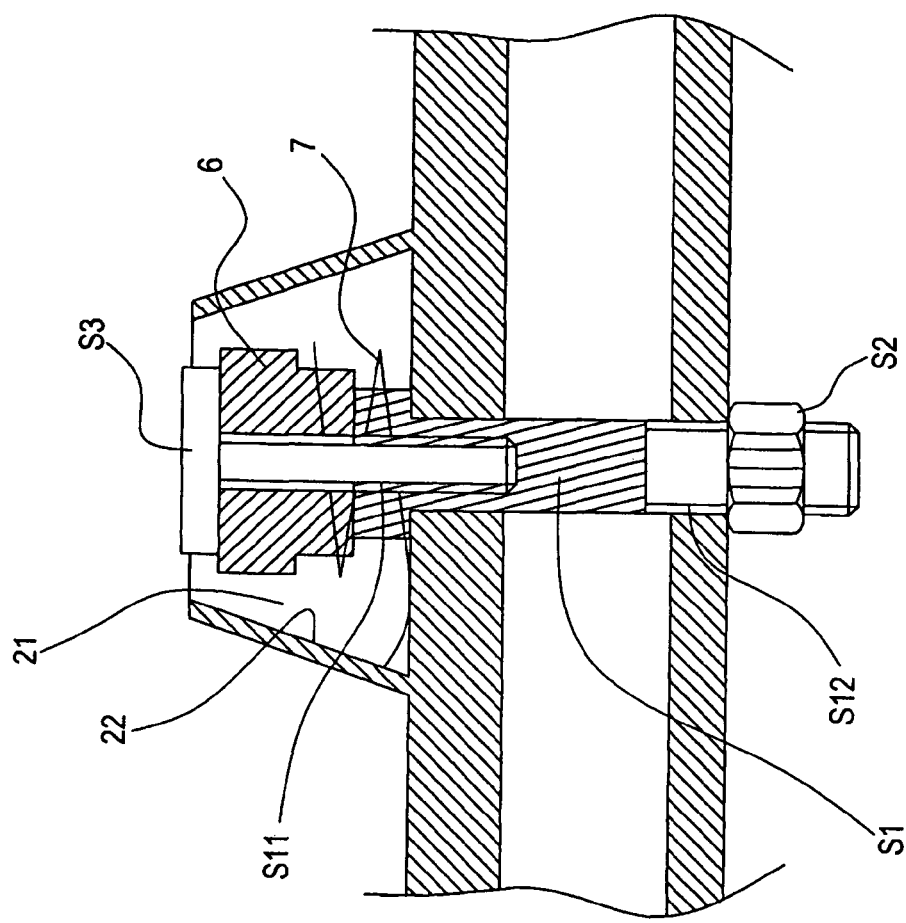
FIG. 6 is a longitudinal sectional view of FIG. 1.

Referring to FIGS. 1 to 6, a bicycle bell 1 in accordance with a preferred embodiment of the invention comprises the following components as discussed in detail below.

A housing 2 is provided with a brake lever (not numbered and shown in phantom in FIG. 1) being pivotably connected thereto. The housing 2 is mounted on a handlebar (not shown) and comprises a vertical channel 21 open to both top and bottom, and an upward extending flange 22 partially surrounding the top of the channel 21.

An abutment member 3 comprises a horizontal base 31 and a vertical triangular section 32 extending upward from one end of the base 31. The abutment member 3 is threadedly secured to the housing 2. A guide member 4 extends from the top corner of the vertical triangular section 32 toward the housing 2 and is parallel to the base 31. Both the abutment member 3 and the guide member 4 are made of plastic and are formed integrally.

A metal drum 5 is threadedly secured to the vertical triangular section 32 with both the abutment member 3 and the guide member 4 being covered therein.

A striking device 6 comprises a bell lever 61, a resilient clapper 62 opposite the bell lever 61 and extending through an elongated transverse opening (not numbered) between both sides of the upward extending flange 22 to contact one side of the guide member 4, a central through hole (not numbered) between the bell lever 61 and the clapper 62, and a cavity 63 adjacent the central through hole.

An expansion spring 7 has one end anchored in the cavity 63 and the other end urged against an inner wall of the upward extending flange 22 to rest upon an internal shoulder of the channel 21. A bolt S1 has an upper internally threaded section S11 and a lower externally threaded section S12. The bolt S1 is inserted through both the expansion spring 7 and the channel 21 to cause its lower externally threaded section S12 to threadedly secure to a nut S2 on the bottom of the housing 2. A threaded fastener S3 is driven through the central through hole of the striking device 6 into the upper internally threaded section S11 to pivotably secure the striking device 6 to the bolt S1. Hence, the expansion spring 7 is biased between the striking device 6 and the internal shoulder of the channel 21. As a result, the striking device 6 is implemented as a spring biased member.

Referring to FIGS. 3 to 6 specifically, a ringing operation of the invention will be described in detail below. A rider may pivot the bell lever 61 to pivotably move the clapper 62 to strike a first position on an inner surface of the drum 5 after passing the guide member 4 as indicated by path P1 in FIG. 4. Also, the expansion spring 7 is compressed to store elastic energy. As a result, a first particular sequence of tones is played.

The rider may release the bell lever 61 to cause the expansion spring 7 to release it stored energy. As such, the clapper 62 returns to its inoperative position after passing the guide member 4 and striking an opposite second position on the inner surface of the drum 5 as indicated by path P2 in FIG. 5. As a result, a second particular sequence of tones is played.

The invention has the following advantages. The ringing operation of the bell 1 can be done while braking by squeezing the brake lever with the same hand because the bell 1 is mounted in the vicinity of the brake lever. Hence, the ringing operation is easy and the braking operation done at the same time is very safe. Moreover, two different particular sequences of tones are played in one striking operation. Hence, it is more effective as a warning device. Further, the clapper 62 is substantially covered by the drum 5. Hence, the clapper 62 is protected from rain, dust accumulation, and other undesired objects. This can prolong the useful life of the bell 1.

While the invention herein disclosed has been described by means of specific embodiments, numerous modifications and variations could be made thereto by those skilled in the art without departing from the scope and spirit of the invention set forth in the claims.

What is claimed is:

1. A bell for a bicycle, comprising, in combination:
   a housing mounted on a handlebar and comprising a channel and an upward extending flange partially surrounding a top of the channel;
   a guide member secured to the housing;
   a drum secured to the housing to cover the guide member;
   a striking device comprising a bell lever, a clapper opposite the bell lever and extending through the upward extending flange to contact the guide member, a central through hole, and a cavity adjacent the central through hole; and
   means for resiliently fastening the striking device on the top of the channel comprising an expansion spring having one end anchored in the cavity and the other end urged against an inner wall of the upward extending flange to dispose in the channel, a bolt having an upper internally threaded section and a lower externally threaded section, the bolt being inserted through both the expansion spring and the channel, a nut threadedly secured to the lower externally threaded section of the bolt on a bottom of the housing, and a threaded fastener driven through the central through hole into the upper internally threaded section to pivotably secure the striking device to the bolt,
   whereby pivoting the bell lever about the channel will pivotably move the clapper to strike a first position on an inner surface of the drum after passing the guide member; and
   whereby releasing the bell lever will return the clapper to its inoperative position contacting the guide member after passing the guide member and striking an opposite second position on the inner surface of the drum.

* * * * *